Nov. 9, 1937.  H. S. LEADER ET AL  2,098,456

SEAT BACK

Filed May 20, 1935

Witness:
Geo. L. Chapel

Hubert S. Leader
Henry P. Nordmark.
INVENTOR.

BY Rice and Rice

ATTORNEYS.

Patented Nov. 9, 1937

2,098,456

UNITED STATES PATENT OFFICE 2,098,456

SEAT BACK

Hubert S. Leader and Henry P. Nordmark, Grand Rapids, Mich., assignors to American Seating Company, Grand Rapids, Mich., a corporation of New Jersey Application May 20, 1935, Serial No. 22,378

4 Claims. (Cl. 155—178)

The instant invention relates to seat backs and more particularly to the construction and assembly of seat backs for seats of the general character shown in our co-pending application, Serial No. 22,379, filed May 20, 1935, allowed June 16, 1936, and by us assigned to our assignee hereof, the same being Patent No. 2,066,630.

The primary objects of the present invention are to provide a seat back of the character above indicated which is especially adapted for use in a motor bus; to provide such a seat back which is relatively light in weight but which is nevertheless sufficiently rugged and sturdy in construction to stand up in common carrier use; to provide such a seat back which may be readily and conveniently assembled; and, to provide such a seat back which is comfortable in use, economical in manufacture and which may be readily re-upholstered.

An illustrated embodiment of the invention is shown in the accompanying drawing, wherein:—

Figure 3:
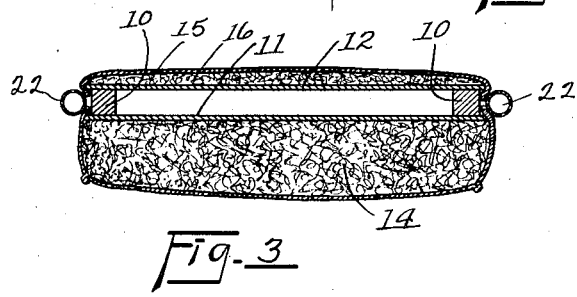
Figure 3 is a sectional view on line 3—3 of Figure 1.

Referring to the drawing in which like parts of the structure there shown are designated by the same numerals in the several views, the seat back per se is here shown as comprising a rectangular frame 10 of wood or other suitable material having a front panel 11 and a rear panel 12 secured to its opposite sides as by screws or the like, not shown, the respective opposite marginal side edges of each panel overhanging the sides of the rectangular frame 10 as best shown in Figure 3. The seat back however, may if desired be otherwise formed to provide such channels in the opposite sides thereof.

Both panels 11, 12 are here shown as upholstered, the front panel being provided with leather or other suitable flexible upholstery sheet or covering material 13 over hair 14 or other similar padding between its inside surface and the surface of the panel 11 and the rear panel being provided with similar covering material 15 disposed over similar padding 16 which covering material is secured to the rectangular frame 10 in any conventional manner as by tacks not shown.

The seat back may if desired be provided with an integrally formed head rest but the head rest here shown is separately formed and comprises a similar frame 17 having a front panel 18 and a rear panel 19 secured to its opposite sides, the opposite ends of the head rest likewise being provided with a channel formed in a manner like the opposite side channels of the seat back and as heretofore described. This head rest is likewise preferably upholstered and in a manner similar to that of the seat back and as herein illustrated.

Figure 1:
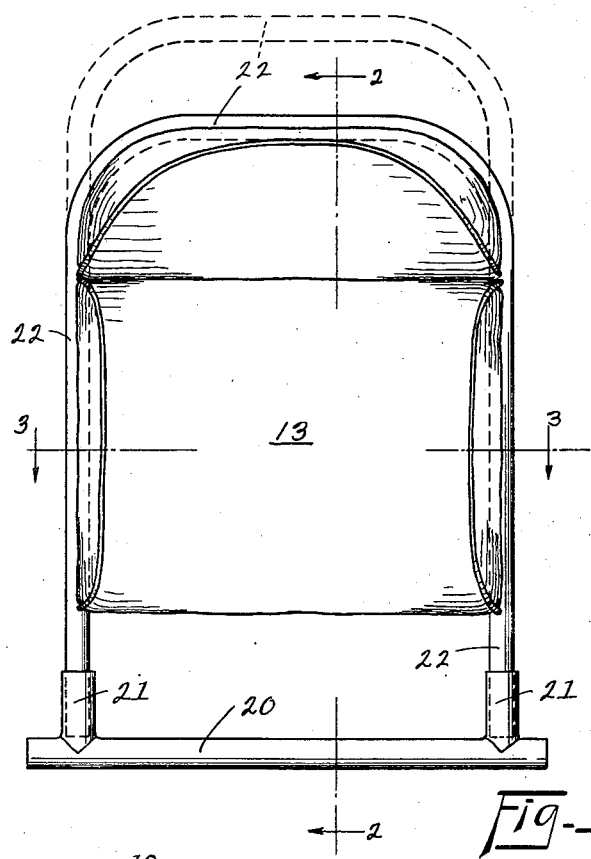
Figure 1 is a front elevational view of the seat back, the manner of assembling the frame with its back being indicated in dotted lines.
Figure 2:
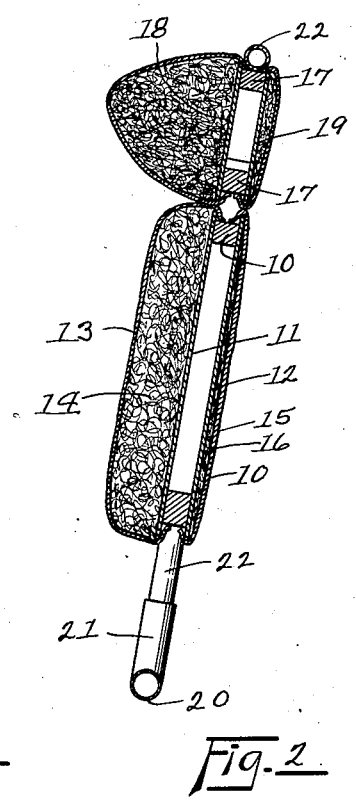
Figure 2 is a sectional view thereof on line 2—2 of Figure 1.

A frame member for the seat back is here shown as comprising (1) a tubular member 20 provided with spaced transverse sleeves 21 and (2) an inverted U-shaped tubular member 22 whose opposite ends embrace the head rest and seat back therebelow within their respective opposite channels and whose free ends are engaged with the spaced transverse sleeves. This frame member is assembled with the seat back and its head rest by sliding the U-shaped member downwardly from the position shown in dotted lines as indicated by the arrow in Figure 1 to the position shown in full lines in the same view, whereby the sleeves 21 of the tubular member 20 thus reinforce and strengthen the assembled seat back structure.

The lateral marginal edge portions of the upholstery sheet or covering material are turned over the sides of the channels and thereinto and are held therein by said opposite ends of the U-shaped member 22 as shown in Figure 3.

It will thus be seen that the seat back herein shown and described is relatively light in weight yet is rugged and sturdy in construction, that the structure may be readily and conveniently assembled, and that the seat back is comfortable in use, economical in manufacture and may be readily re-upholstered.

While but one specific embodiment of this invention has been herein shown and described, it will be understood that numerous details of the construction shown may be altered or omitted without departing from the spirit of this invention as defined by the following claims.

We claim:

1. In a construction of the class described, a seat back comprising a rectangular frame having panels secured to the opposite sides thereof and whose respective opposite marginal side edges overhang the sides of the frame forming channels in the opposite sides of the seat back, and a frame member for the seat back comprising (1) a tubular member provided with spaced transverse sleeves and (2) a U-shaped tubular member whose opposite lengths embrace the seat back within its opposite channels and whose free ends are engaged within the spaced transverse sleeves.

2. In a construction of the class described, a seat back whose opposite sides are provided with a channel and a frame member for the seat back comprising (1) a tubular member provided with spaced transverse sleeves and (2) a U-shaped tubular member whose opposite lengths embrace the seat back within its opposite channels and whose free ends are engaged within the spaced transverse sleeves.

3. In a construction of the class described, a seat back whose opposite sides are provided with a channel, and a frame member for the seat back comprising (1) a member provided with spaced transverse sleeves and (2) a U-shaped member having a pair of spaced posts, each post being disposed within a channel of the seat back and being engaged within a sleeve of said member.

4. In a construction of the class described, a seat back whose opposite sides are provided with a channel, a flexible upholstery sheet covering a face of the seat back and having lateral edge portions turned over into the channels respectively, and a frame member for the seat back comprising (1) a member provided with spaced transverse sleeves and (2) a pair of spaced posts, each post being disposed within a channel of the seat back and being engaged within a sleeve of said member.

HUBERT S. LEADER.
HENRY P. NORDMARK.